(12) United States Patent
Kato et al.

(10) Patent No.: US 7,768,208 B2
(45) Date of Patent: Aug. 3, 2010

(54) DISCHARGE LAMP APPARATUS

(75) Inventors: Koichi Kato, Toyoake (JP); Yoshitaka Sato, Toyohashi (JP)

(73) Assignee: Denso Corporation, Kariya (JP)

( * ) Notice: Subject to any disclaimer, the term of this patent is extended or adjusted under 35 U.S.C. 154(b) by 238 days.

(21) Appl. No.: 12/007,742

(22) Filed: Jan. 15, 2008

(65) Prior Publication Data

US 2008/0136349 A1    Jun. 12, 2008

Related U.S. Application Data

(63) Continuation of application No. 11/270,720, filed on Nov. 10, 2005, now Pat. No. 7,531,964.

(30) Foreign Application Priority Data

Nov. 11, 2004  (JP) ............................ 2004-327775
Oct. 7, 2005    (JP) ............................ 2005-295347

(51) Int. Cl.
*B60Q 1/14*      (2006.01)
*B60Q 17/36*    (2006.01)

(52) U.S. Cl. ......................................... 315/77; 315/82

(58) Field of Classification Search .................. 315/77, 315/80, 82; 362/58, 265, 375, 631; 313/609, 313/610
See application file for complete search history.

(56) References Cited

U.S. PATENT DOCUMENTS

| 5,906,428 | A |  | 5/1999 | Hori et al. |
| 6,161,951 | A |  | 12/2000 | Yoneyama et al. |
| 6,322,239 | B1 |  | 11/2001 | Nitta et al. |
| 6,870,317 | B2 | * | 3/2005 | Ito et al. ..................... 313/631 |
| 7,172,316 | B2 | * | 2/2007 | Duarte et al. ............... 362/265 |
| 7,222,990 | B2 | * | 5/2007 | Duarte et al. ............... 362/265 |
| 7,531,964 | B2 | * | 5/2009 | Kato et al. .................... 315/77 |
| 2003/0179587 | A1 |  | 9/2003 | Nishiyama |

FOREIGN PATENT DOCUMENTS

| JP | 06-334358 | 12/1994 |
| JP | 9-289383 | 11/1997 |
| JP | 10-051158 | 2/1998 |
| JP | 2003-303512 | 10/2003 |
| JP | 2004-064856 | 2/2004 |
| JP | 2004-171916 | 6/2004 |

OTHER PUBLICATIONS

Japanese Office Action dated Dec. 8, 2009, issued in corresponding Japanese Application No. 2005-295347, with English translation.

* cited by examiner

*Primary Examiner*—Douglas W Owens
*Assistant Examiner*—Minh D A
(74) *Attorney, Agent, or Firm*—Nixon & Vanderhye PC

(57) ABSTRACT

In a discharge lamp apparatus for lighting a discharge lamp, a ballast is disposed outside of a lamp housing of a discharge lamp and is electrically connected to the discharge lamp through a connector. A ballast housing of the ballast is connected to a bottom wall of the lamp housing. In the ballast housing, a ballast circuit board is arranged along a top wall of the ballast housing that is opposed to the lamp housing. Accordingly, it is less likely that the ballast circuit board will be wetted by condensation or water vapor entered the ballast housing. Additionally, a partition wall can be provided in the ballast housing between the connector and the ballast circuit board to block the condensation or water vapor from flowing toward the ballast circuit board.

10 Claims, 4 Drawing Sheets

DISCHARGE LAMP APPARATUS

CROSS-REFERENCES TO RELATED APPLICATIONS

This application is a continuation of application Ser. No. 11/270,720, filed Nov. 10, 2005, the entire contents is hereby incorporated by reference in this application. This application is also based on Japanese Patent Applications No. 2004-327775 filed on Nov. 11, 2004 and No. 2005-295347 filed on Oct. 7, 2005, the disclosures of which are incorporated herein by reference.

FIELD OF THE INVENTION

The present invention relates to a discharge lamp apparatus for lighting a discharge lamp, and particularly relates to a discharge lamp lighting apparatus having a lighting control unit outside of a lamp housing.

BACKGROUND OF THE INVENTION

In general, a discharge lamp apparatus having a lighting control unit (hereafter, referred to as a ballast) outside of a lamp housing is provided with a connector for electrically connecting the ballast and an inside of the lamp housing. This kind of discharge lamp apparatus is known in Japanese Unexamined Patent Publications No. 9-289383 and No. 10-51158, for example.

In such a discharge lamp apparatus, it is known to provide a sealing member around the connector to prevent condensation, which is generated in the lamp housing due to heat of a discharge lamp, from entering a ballast housing. However, if the sealing member is deteriorated over time and a sealing effect is reduced, condensation or water vapor generated in the lamp housing is likely to be sucked into the ballast housing through deteriorated portion of the sealing member when the temperature inside the ballast housing is lowered. As a result, a ballast circuit board housed in the ballast housing and terminals of components mounted on the ballast circuit board may be corroded.

Also, it is known to form a ventilation hole in the connector for allowing communication between the ballast housing and the lamp housing. The ventilation hole functions to release heat generated from electrical components and electronic parts mounted on the ballast circuit board outside of the ballast housing, thereby suppressing a temperature increase in the ballast housing.

Also in this structure, however, condensation or water vapor generated in the lamp housing is likely to be sucked in the ballast housing through the ventilation hole when the temperature inside the ballast housing is lowered. This may result in corrosion of the ballast circuit board and terminals of the components installed in the ballast circuit board.

SUMMARY OF THE INVENTION

The present invention is made in view of the foregoing matters, and it is an object of the present invention to provide a discharge lamp apparatus for lighting a discharge lamp, having a structure for protecting electric and electronic components inside a ballast housing from corroding due to condensation and water vapor.

According to a discharge lamp apparatus of the present invention, a ballast is located outside of a lamp housing and is electrically connected to a discharge lamp housed in the lamp housing through a connector. The ballast has a ballast housing and a ballast circuit board. The ballast housing is connected to the lamp housing such that a top wall of the ballast housing faces a bottom wall of the lamp housing. The ballast circuit board is arranged in the ballast housing along the top wall of the ballast housing. Accordingly, it is less likely that the ballast circuit board will be influenced by condensation or water vapor entered the ballast housing. Thus, the ballast circuit board is protected from corroding.

Irrespective of the arrangement of the ballast circuit board in the ballast housing, a partition wall can be provided between the ballast circuit board and the connector as a means for protecting the ballast circuit board from the condensation and water vapor. The partition wall blocks the condensation and water vapor entered the ballast housing from flowing toward the ballast circuit board.

Alternatively, the ballast circuit board can be arranged along a bottom wall of the ballast housing. In this case, the ballast circuit board is formed with a hole at a position corresponding to the connector. The condensation and water vapor, sucked in the ballast housing through a connecting portion between the connector and the ballast housing or through a ventilation hole of the connector, will pass through the hole and directly drop on the bottom wall of the ballast housing. Therefore, it is less likely that the ballast circuit board will directly receive the condensation and water vapor.

Instead, the ballast can be connected to a side wall of the lamp housing. In this case, the ballast circuit board is arranged at a position higher than the ventilation hole of the connector. Therefore, it is less likely that the ballast circuit board will be influenced by condensation and water vapor entered through the ventilation hole. Also, it is less likely that the ballast circuit board will be wetted by water accumulated at a bottom of the ballast housing.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EMBODIMENTS

Figure 1:
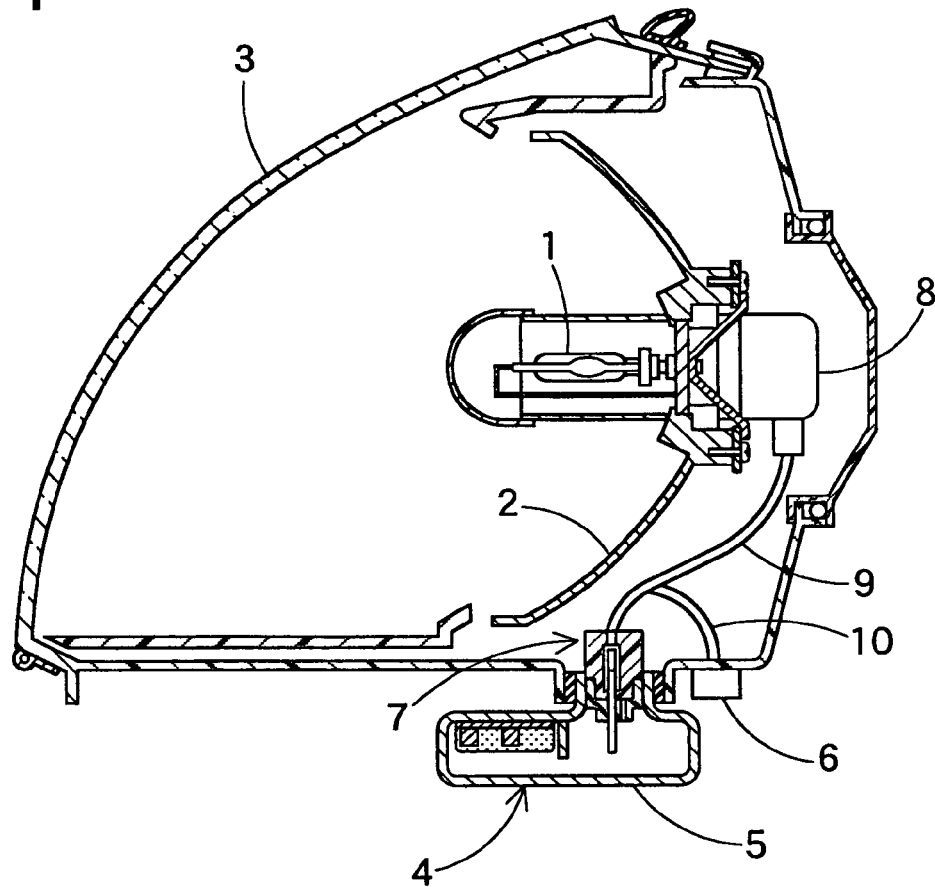
FIG. 1 is a cross-sectional view of a discharge lamp apparatus according to a first embodiment of the present invention.

Embodiments of the present invention will be described hereinafter with reference to the drawing.

First Embodiment

As shown in FIG. 1, a discharge lamp apparatus of the first embodiment has a bulb 1, a reflector 2, a lamp housing 3, a ballast 4, a power connector 6, a ballast connector 7, a lamp connector 8, and the like. The bulb 1 is a high-voltage discharge lamp such as a metal halide lamp. The reflector 3 is provided to reflect light generated from the bulb 1.

The power connector 6 is connected to an external power source to supply the discharge lamp apparatus with power. The ballast 4 has a ballast housing 5. Components inside the ballast housing 5 and components inside the lamp housing 3 are electrically connected through the ballast connector 7. The lamp connector 8 is electrically connected to the bulb 1. Further, the ballast connector 7 and the lamp connector 8 are electrically connected through a code 9. The power connector 6 and the ballast connector 7 are electrically connected through a code 10.

Figure 2:
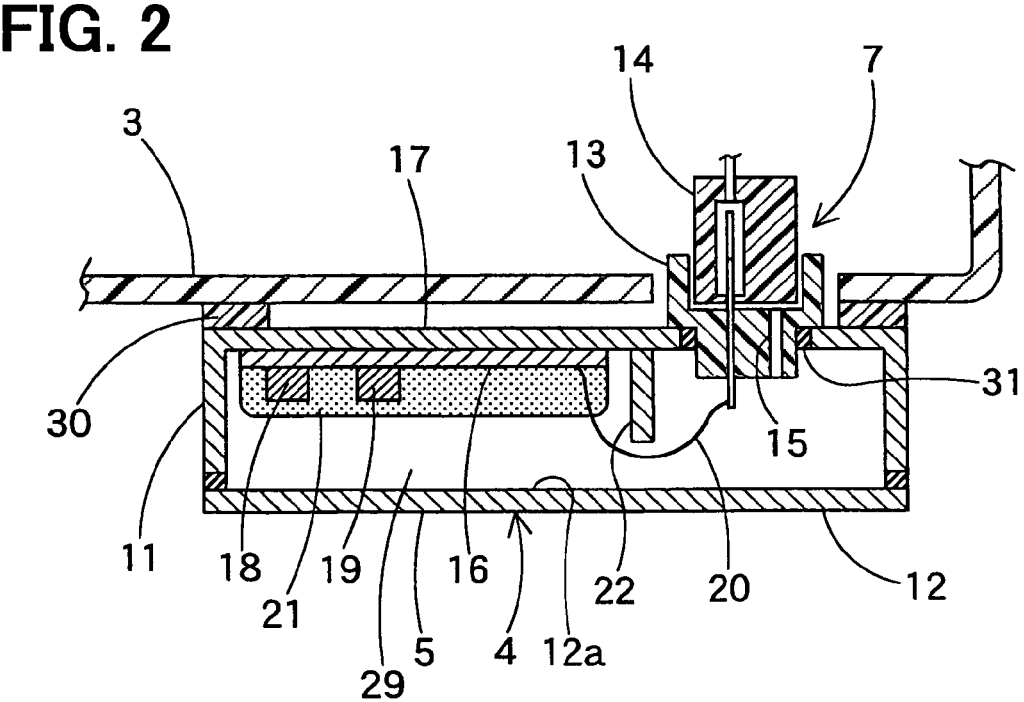
FIG. 2 is a cross-sectional view of a main part of the discharge lamp apparatus according to the first embodiment of the present invention.

Further, the ballast 4 is located outside of the lamp housing 3. In the first embodiment, specifically, the ballast 4 is arranged on an outer bottom wall of the lamp housing 3, as shown in FIG. 2. The ballast housing 5 is fixed to the bottom wall of the lamp housing 3 by using fixing means such as screws, although not illustrated. Further, a sealing member 30, having an annular or ring shape, is sandwiched between the bottom wall of the lamp housing 3 and an upper wall of the ballast housing 5, to prevent entry of water into the ballast housing 5 from outside.

The ballast housing 5 has a case (upper case) 11 and a cover 12. The case 11 and the cover 12 are fixed to each other. The ballast connector 7, which does not have water resistance, is mounted to the case 11. The ballast connector 7 has a female connector 13 and a male connector 14. The female connector 13 is formed with a ventilation hole 15 for allowing communication between the ballast housing 5 and the lamp housing 3. Further, an annular sealing member 31 is provided between the female connector 13 and the case 11 of the ballast housing 5.

In the ballast housing 5, a ballast circuit board 16 is housed. Specifically, the ballast circuit board 16 is fixed to a ceiling (inner top wall) 17 of the ballast housing 5, the ceiling 17 being opposed to the bottom wall of the lamp housing 3. The ballast circuit board 16 is parallel to the ceiling 7, and is located separate from the ballast connector 7 in a horizontal direction.

The ballast circuit board 16 is provided with electrical and electronic components 18, 19, such as a DC/DC converter and a processing circuit. The ballast circuit board 16 is electrically connected to the ballast connector 7 through a lead wire 20. Further, a gel waterproof agent 21 is applied to the ballast circuit board 16 to cover the ballast circuit board 16 and on-board components 18, 19.

The ballast housing 5 forms a predetermined clearance 29 between a lower surface of the gel waterproof agent 21 and an inner bottom wall 12a of the ballast housing 5. Water entered through the ventilation hole 15 and condensed in the ballast housing 5 is accumulated in the predetermined clearance 29.

Therefore, it is less likely that the ballast circuit board 16 and the on-board components 18, 19 will be corroded. Preferably, the clearance 29 is equal to or greater than 0.2 mm. More preferably, the clearance is greater than 0.5 mm.

The case 11 of the ballast housing 5 is provided with a partition wall 22 for separating the ballast circuit board 16 from the ballast connector 7 in the horizontal direction. The partition wall 22 hangs from or extends from the ceiling 17.

Here, the partition wall 22 provides a means for blocking condensation or water in the ballast housing 5 from flowing toward the ballast circuit board 16. The partition wall 22 can be integrally formed into the case 11. Alternatively, the partition wall 22 can be provided as a separate member and fixed to the case 11. Further, the separation wall 22 can be made of gel.

In the discharge lamp apparatus having the above structure, if the temperature inside the ballast housing 5 is lowered and air shrinks, condensation and water vapor generated in the lam housing 3 are sucked in the ballast housing 5 through the ventilation hole 15. Further, if the sealing member 31 is deteriorated over time, such condensation and water vapor is sucked in the ballast housing 5 through the deteriorated sealing member 31.

In the first embodiment, however, the ballast circuit board 16 is fixed to the ceiling 17 of the ballast housing 5, and the lower surface of the ballast circuit board 16 is separated from the inner bottom wall 12a of the ballast housing 5. Further, the ballast circuit board 16 is separate from the ballast connector 7 in the horizontal direction. The partition wall 22 extending from the ceiling 17 is provided between the ballast circuit board 16 and the lower end of the ballast connector 17. Therefore, the condensation and water vapor entered the ballast housing 5 is blocked by the partition wall 22. Also, it is less likely that the ballast circuit board 16 will be wetted by water accumulated on the inner bottom wall 12a of the ballast housing 5.

Accordingly, the ballast circuit board 16 and terminals of the on-board components 18, 19 are protected from corroding due to water. In addition, since the waterproof agent 21 is applied on the ballast circuit board 16, the ballast circuit board 16 and the terminals of the on-board components 18, 19 can be further protected from corroding.

Second Embodiment

Figure 3A:
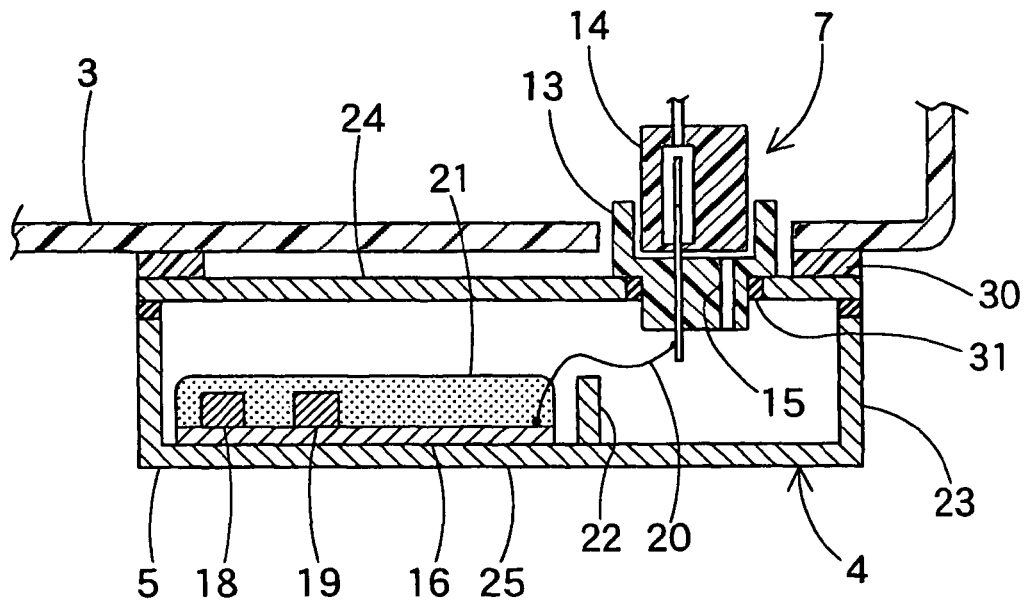
FIG. 3A is a cross-sectional view of a main part of a discharge lamp apparatus according to a second embodiment of the present invention.
Figure 3B:
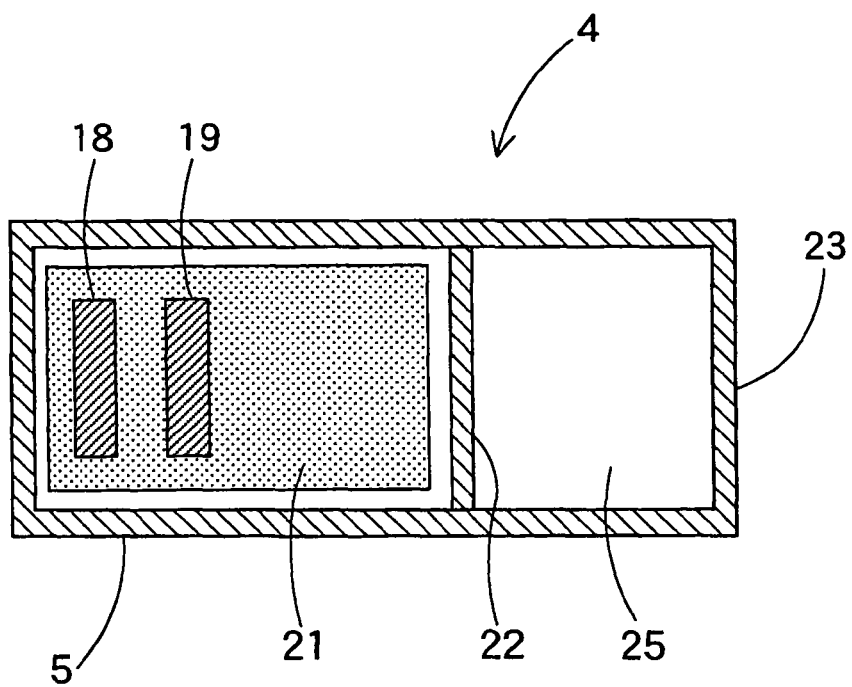
FIG. 3B is a horizontally cross-sectional view of a ballast of the discharge lamp apparatus according to the second embodiment of the present invention.

Referring to FIGS. 3A and 3B, the ballast 4 of the second embodiment is located under the lamp housing 3, similar to the first embodiment. The ballast housing 5 is fixed to the bottom wall of the lamp housing 3 by using fixing means such as screws (not shown). Further, the annular sealing member 30 is sandwiched between the bottom wall of the lamp housing 3 and the upper wall of the ballast housing 5 to prevent water from entering the ballast housing 5 and the lamp housing 3.

As shown in FIG. 3A, the ballast housing 5 of the second embodiment is constructed by a case (lower case) 23 and a cover 24. The case 23 and the cover 24 are fixed to each other. The ballast connector 7 is received in the cover 24. Similar to the first embodiment, the ballast connector 7 has the female connector 13 and the male connector 14. The female connector 13 is formed with the ventilation hole 15. Also, the annular sealing member 31 is provided between the female connector 13 and the cover 24.

The ballast circuit board 16 is fixed to a bottom wall 25 of the lower case 23 and is parallel to the bottom wall 25. As shown in FIGS. 3A and 3B, the ballast circuit board 16 is located separate from the ballast connector 7 in the horizontal direction.

The ballast circuit board 16 is provided with the electrical and electronic components 18, 19, such as a DC/DC converter and a processing circuit. The ballast circuit board 16 is electrically connected to the ballast connector 7 through the lead wire 20. Further, the ballast circuit board 16 and the on-board components 18, 19 are covered with the gel waterproof agent 21.

In the second embodiment, the partition wall 22 is provided on the bottom wall 25 of the ballast housing 5 for separating the ballast circuit board 16 from the ballast connector 7 in the horizontal direction. The partition wall 22 extends from the bottom wall 5. Similar to the first embodiment, the partition wall 22 provides means to block condensation and water vapor, which has passed through the ventilation hole 15 or the deteriorated sealing member 31, from flowing toward the ballast circuit board 16.

The partition wall 22 can be integrally formed into the lower case 23. Alternatively, the partition wall 22 can be provided as a separate member and fixed to the lower case 23. Further, the partition wall 22 can be made of gel.

In the second embodiment, the ballast circuit board 16 is located separate from the ballast connector 7 in the horizontal direction. That is, the ballast circuit board 16 does not face the lower end of the ballast connector 7 in the vertical direction. Also, the partition wall 22 is provided on the bottom wall 25 between the ballast connector 7 and the ballast circuit board 16. Therefore, the condensation and water vapor entered the ballast housing 5 through the ventilation hole 15 or the deteriorated sealing member 31 are blocked by the partition wall 22. Accordingly, even when the ballast circuit board 16 is laid on the bottom wall 25, it is less likely that the ballast circuit board 16 and the terminals of the components 18, 19 will be wetted and corroded by such water. In addition, the ballast circuit board 16 and the terminals of the on-board components 18, 19 can be further protected from the water by the waterproof agent 21.

Third Embodiment

Figure 4:
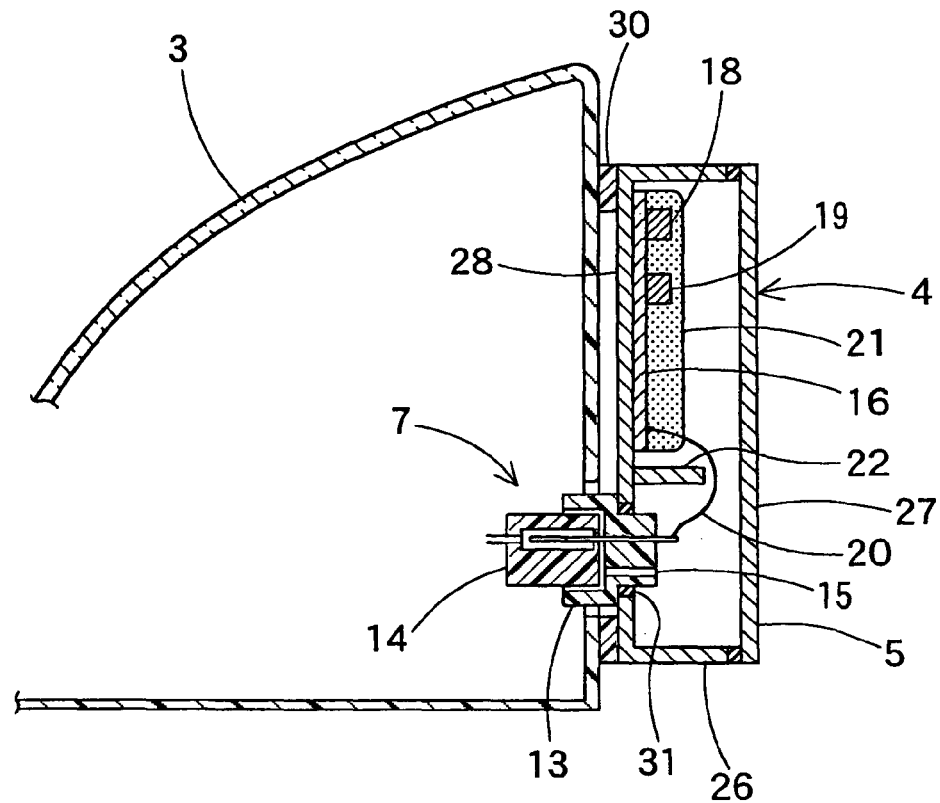
FIG. 4 is a cross-sectional view of a main part of a discharge lamp apparatus according to a third embodiment of the present invention.

In the third embodiment, the ballast 4 is located on a side of the lamp housing 3, as shown in FIG. 4. The ballast housing 5 is fixed to a side wall of the lamp housing 3 by using fixing means such as screws (not shown). The annular sealing member 30 is provided between the side wall of the lamp housing 3 and a side wall of the ballast housing 5 for preventing the entry of water from outside.

The ballast housing 5 has a case 26 on a side of the lamp housing 3 and a cover 27 fixed to the case 26. Further, the ballast connector 7 is received in the case 26. The ballast connector 7 is provided with the female connector 13 having the ventilation hole 15 and the male connector 14. The annular sealing member 31 is provided between the female connector 13 and the case 26. Furthermore, the ballast connector 7 is located close to a lower part of the ballast housing 5.

The ballast circuit board 16 is housed in the ballast housing 5 at a position higher than the ballast connector 7. The ballast circuit board 16 is fixed to a side wall 28 of the ballast housing 5, which is opposed to the side wall of the lamp housing 3. The ballast circuit board 16 is arranged parallel to the side wall 28. Moreover, the ballast circuit board 16 is located separate from the ballast connector 7 in a vertical direction.

Similar to the above embodiments, the electrical and electronic components 18, 19 are mounted to the ballast circuit board 16. The ballast circuit board 16 is electrically connected to the ballast connector 7 through the lead wire 20. Further, the ballast circuit board 16 and the on-board components 18, 19 are covered with the gel waterproof agent 21.

In the ballast housing 5, the partition wall 22 extends substantially horizontally from the side wall 28, between the ballast circuit board 16 and the ballast connector 7. The partition wall 22 provides means for preventing the condensation or water vapor from moving toward the ballast circuit board 16, similar to the first and second embodiments. The partition wall 22 can be integrated into the case 26. Instead, the partition wall 22 can be provided as a separate member and fixed to the case 26. The partition wall 22 can be made of gel.

In the third embodiment, the ballast circuit board 16 is located close to a top part of the ballast housing 5 and is higher than the ventilation hole 15 of the ballast connector 7. Also, the ballast circuit board 16 is separate from the ballast connector 7 in the vertical direction. Further, the ballast circuit board 16 is connected along the side wall 28, and the partition wall 22 extends substantially horizontally from the side wall 28 between the ballast circuit board 16 and the ballast connector 7.

Accordingly, it is less likely that condensation and water vapor will move toward the ballast circuit board 16 and the ballast circuit board will be wetted by water accumulated at the bottom of the ballast housing 5. Therefore, the ballast circuit board 16 and the terminals of the components 18, 19 can be protected from corroding. Also, the terminals of the components 18, 19 can be further protected from corroding, by the waterproof agent 21.

Fourth Embodiment

Figure 5:
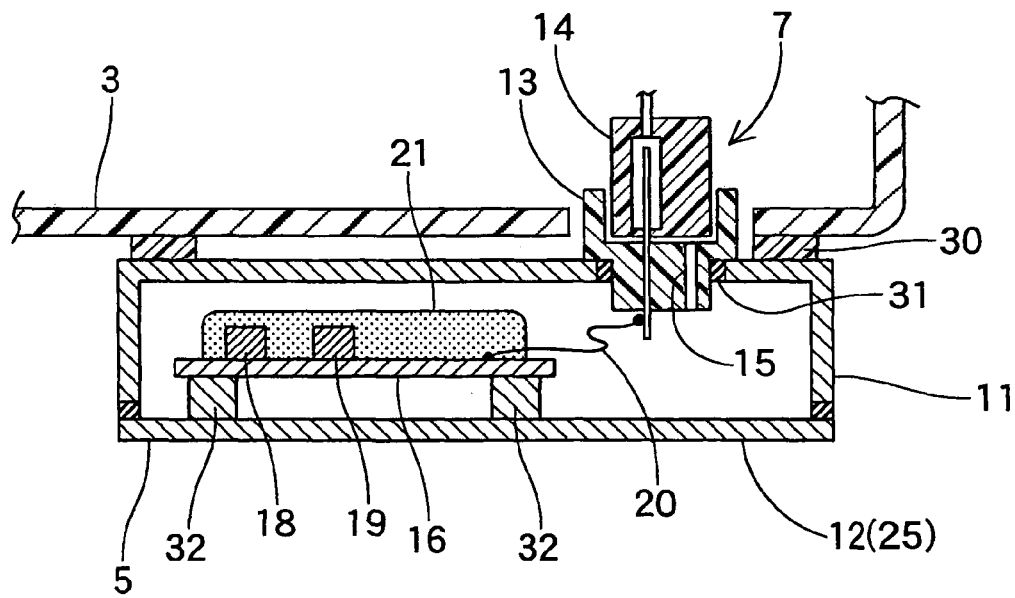
FIG. 5 is a cross-sectional view of a main part of a discharge lamp apparatus according to a fourth embodiment of the present invention.

Referring to FIG. 5, the ballast 4 of the fourth embodiment is located under the lamp housing 3, similar to the second embodiment, but does not have the partition wall 22. The ballast circuit board 16 is arranged at a position higher than the cover 12, which provides the bottom wall 25 of the ballast housing 5. Moreover, the ballast circuit board 16 is located at a vertically middle position of an inner space of the ballast housing 5.

Specifically, the bottom wall 25 has support pillar portions 32 as a ballast circuit board supporting means (support member). The ballast circuit board 16 is laid on the support pillar portion 32. Thus, a bottom surface of the ballast circuit board 16 is separate from the bottom wall 25. Alternatively, the support pillar portions 32 can be formed to extend from the bottom surface of the ballast circuit board 16, such as legs. In this case, the support pillar portions 32 are fixed to the bottom wall 25 of the cover 12. Further, the ballast circuit board supporting means can be provided by other means. For example, the ballast circuit board 16 can be supported by a support member extending from an inner side wall of the ballast housing 5.

In the fourth embodiment, since the ballast circuit board 16 is arranged separate from the bottom wall 25 and a top wall of the ballast housing 5. Therefore, it is less likely that the ballast circuit board 16 is influenced by water accumulated at the bottom of the ballast housing 5. Accordingly, the ballast circuit board 16 and the terminals of the on-board components 18, 19 are protected from corroding.

Furthermore, the ballast circuit board 16 is located at a position without facing the ballast connector 7. That is, the ballast circuit board 16 is not located underneath the ballast connector 7. Accordingly, it is less likely that the water dropping through the ballast connector 7 will directly fall on and adhere to the ballast circuit board 16.

Fifth Embodiment

Figure 6:
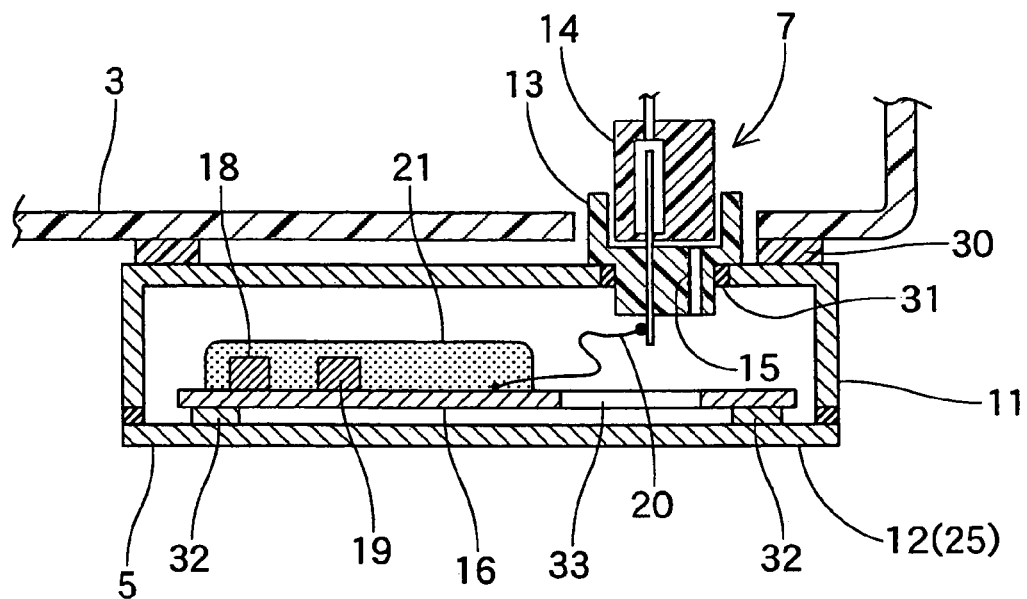
FIG. 6 is a cross-sectional view of a main part of a discharge lamp apparatus according to a fifth embodiment of the present invention.

In the fifth embodiment, the ballast housing 5 and the ballast circuit board 16 housed therein are arranged in a manner similar to the fourth embodiment, as shown in FIG. 6. However, the ballast circuit board 16 is elongated to a position opposed to the ballast connector 7. Further, the elongated ballast circuit board 16 is formed with a hole 33 at a position opposing the ballast connector 7.

In the fifth embodiment, the ballast circuit board 16 is arranged separate from both the bottom wall 25 and the inner top wall of the ballast housing 5, similar to the fourth embodiment. Therefore, it is less likely that the ballast circuit board 16 and the on-board components 18, 19 will be wetted by water accumulated at the bottom of the ballast housing 5. Furthermore, water dropping from the ballast connector 7 passes through the hole 33 and directly drops on the bottom wall 25 of the ballast housing 5. Therefore, it is less likely that the ballast circuit board 16 will be directly wetted.

Sixth Embodiment

Figure 7:
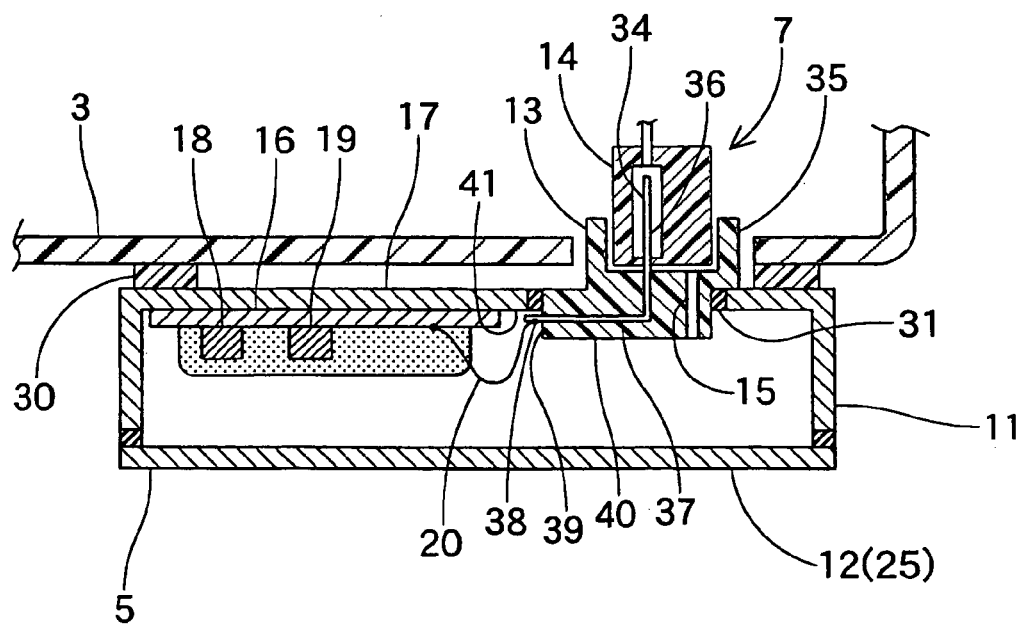
FIG. 7 is a cross-sectional view of a main part of a discharge lamp apparatus according to a sixth embodiment of the present invention.

In the sixth embodiment, the ballast connector 7 has a structure different from those of the first to fifth embodiments. As shown in FIG. 7, the ballast connector 7 of the sixth embodiment has a resinous case portion 35 in which a L-shaped terminal 34 is insert-molded. The resinous case portion 35 provides the female connector 13. The L-shaped terminal 34 includes a first portion 36 extending in the vertical direction and a second portion 37 extending from the first portion 36 in the horizontal direction. An end 38 of the horizontal second portion 37 exposes from a side wall 39 of the resinous case portion 35, on a side of the ballast circuit board 16.

Since the end 38 of the terminal 34 protrudes from the side wall 39, it is less likely that water flowing along walls of the ballast connector 7 will adhere to the terminal 34. The water will reach a bottom wall (lower end) 40 of the resinous case portion 35 through the side wall 39 and the like, and will drop from the bottom wall 40. Therefore, it is less likely that the water will adhere to the terminal 34 and reach the ballast circuit board 16 through the terminal 34 and the lead wire 20.

In the first to sixth embodiments except the third embodiment, the ballast connector 7 is connected to the ballast housing 5 such that the lower end 40 of the ballast connector 7 protrudes from the inner top wall of the ballast housing 5. That is, the lower end 40 of the ballast connector 7 is positioned lower than an inner top wall 41 of the ballast housing 5. In such a construction, water reaches the lower end 40 of the ballast connector 7 and drops down from the lower end 40 rather than drops from the inner top wall 41 of the ballast housing 5. Therefore, it is less likely that the water will reach the ballast circuit board 16 through the inner top wall 41.

The above embodiments can be combined in any variations. For example, the ballast circuit board 16 of the sixth embodiment can be replaced into the ballast circuit board 16 having the hole 33 of the fifth embodiment. In this case, the resinous case portion 35 can be arranged to pass through the hole 33, so the lower end 40 of the resinous case portion 35 is located lower than the ballast circuit board 16. Thus, it is less likely that the water entered from the ventilation hole 15 will adhere to the ballast circuit board 16. Also, this arrangement of the ballast circuit board 16 is advantageous to effectively use the inner space of the ballast housing 5.

In the above embodiments, the ballast connector 7 is formed with the ventilation hole 15. However, the present invention can be applied to a case in which the ballast connector 7 does not have the ventilation hole 15.

The present invention is not limited to the above embodiments, but may be implemented in other ways without departing from the spirit of the invention.

The invention claimed is:

1. A discharge lamp apparatus for lighting a discharge lamp, comprising:
    a lamp housing in which the discharge lamp is housed;
    a ballast having a ballast housing connected to a side wall of the lamp housing outside of the lamp housing, the ballast having a ballast circuit board housed in the ballast housing;
    a sealing member provided between said side wall of the lamp housing and an adjacent side wall of the ballast housing for preventing the entry of water from outside;
    a connector connected to the ballast housing for electrically connecting the discharge lamp and the ballast, the connector being located in a vertically lower part of the ballast housing, the connector forming a ventilation hole for allowing communication between a ballast housing and the lamp housing; and
    a partition wall extending substantially horizontally from said side wall of the ballast housing, between the ballast circuit board and the ballast connector, for inhibiting movement of water vapor condensation toward the ballast circuit board, wherein:
    the ballast circuit board is fixed to the ballast housing in such a manner as to be spaced from the ballast connector in a vertical direction, and
    the ballast circuit board is located in a vertically upper part of the ballast housing and is located at a position vertically higher than the ventilation hole of the connector in the ballast housing.

2. A discharge lamp apparatus according to claim 1, wherein the ballast circuit board is fixed to the ballast housing in such a manner as to be arranged parallel to said side wall of the ballast housing.

3. A discharge lamp apparatus according to claim 2, wherein said ballast circuit board is fixed directly to said side wall of the ballast housing.

4. A discharge lamp apparatus according to claim 1, wherein said side wall of the lamp housing to which the ballast housing is connected is oriented generally vertically and the adjacent side wall of the ballast housing from which the partition wall extends is oriented generally vertically, in parallel to said side wall of the lamp housing, with said sealing member being provided therebetween.

5. A discharge lamp apparatus according to claim 1, wherein the ballast circuit board is fixed to said side wall of the ballast housing, said side wall of the ballast housing to which the ballast circuit board is fixed is oriented generally vertically, and the partition wall extends horizontally from said side wall vertically below the ballast circuit board and vertically above the ballast connector.

6. A discharge lamp apparatus according to claim 5, wherein said ballast circuit board is fixed directly to said side wall of the ballast housing.

7. A discharge lamp apparatus according to claim 1, wherein the ballast connector is spaced vertically from a bottom wall of said ballast housing.

8. A discharge lamp apparatus according to claim 1, wherein said partition wall extends part way between opposed side walls of said ballast housing.

9. A discharge lamp apparatus according to claim 8, wherein said opposed side walls of said ballast housing are parallel to each other.

10. A discharge lamp apparatus according to claim 1, wherein the ballast circuit board is disposed so that that there is substantially no clearance provided between the ballast circuit board and said side wall of the ballast housing.

* * * * *